United States Patent [19]

Bender

[11] Patent Number: 5,597,884
[45] Date of Patent: Jan. 28, 1997

[54] PHENOLIC-RESIN-MODIFIED NATURAL RESIN ACID ESTERS, A PROCESS FOR THEIR PREPARATION AND THEIR USE AS BINDER RESINS IN PRINTING INKS

[75] Inventor: Albert Bender, Mainz, Germany

[73] Assignee: Hoechst Aktiengesellschaft, Germany

[21] Appl. No.: 380,634

[22] Filed: Jan. 30, 1995

Related U.S. Application Data

[63] Continuation-in-part of Ser. No. 214,963, Mar. 14, 1994, abandoned.

[30] Foreign Application Priority Data

Mar. 15, 1993 [DE] Germany ............... 43 08 108.8

[51] Int. Cl.$^6$ ............................................. C08G 77/04
[52] U.S. Cl. .................... 528/34; 106/20 R; 106/30 R
[58] Field of Search ............................. 528/304; 106/20, 106/30

[56] References Cited

U.S. PATENT DOCUMENTS

| | | | |
|---|---|---|---|
| 3,880,788 | 4/1975 | Rudolphy | 260/25 |
| 3,935,145 | 1/1976 | Rudolphy | 260/27 BB |
| 4,207,219 | 6/1980 | Rudolphy | 260/25 |
| 4,385,149 | 5/1983 | Tsuchiya et al. | 524/313 |
| 4,528,036 | 7/1985 | Rudolphy | 106/30 |
| 4,552,592 | 11/1985 | Rudolphy et al. | 106/30 |
| 4,552,923 | 11/1985 | Tsuchiya et al. | 525/68 |
| 4,574,057 | 3/1986 | Kaza et al. | 260/101 |
| 4,976,783 | 12/1990 | Werner | 106/20 |

FOREIGN PATENT DOCUMENTS

| | | |
|---|---|---|
| 0041838 | 12/1981 | European Pat. Off. . |
| 0065268 | 11/1982 | European Pat. Off. . |
| 0214526 | 3/1987 | European Pat. Off. . |
| 2488613 | 2/1982 | France . |
| 2150216 | 1/1984 | Germany . |

*Primary Examiner*—Nathan M. Nutter
*Attorney, Agent, or Firm*—Bierman and Muserlian

[57] ABSTRACT

Phenolic-resin-modified natural resin acid esters, a process for their preparation and their use as binder resins printing inks.

Phenolic-resin-modified natural resin acid esters obtained by reaction of

A) natural resins and natural resin acids,
B) mononuclear and polynuclear alkylolizable phenols,
C) aldehydes and aldehydes acetals,
D) aliphatic, cycloaliphatic and araliphatic polyols,
E) calcium compounds and/or zinc compounds and
F) optionally ethylenically unsaturated hydrocarbon resins, at a temperature of 100° to 250° C., and subsequent removal of the water by azeotropic distillation with an entraining agent at 200° to 300° C.

5 Claims, No Drawings

PHENOLIC-RESIN-MODIFIED NATURAL RESIN ACID ESTERS, A PROCESS FOR THEIR PREPARATION AND THEIR USE AS BINDER RESINS IN PRINTING INKS

PRIOR APPLICATION

This application is a continuation-in-part of U.S. patent application Ser. No. 214,963 filed Mar, 14, 1994, now abandoned.

This invention relates to novel phenolic-resin-modified natural resin acid esters which have high solution viscosities in toluene, and to a process for their preparation from natural resins, phenols, aldehydes and esterifying and modifying agents, this process being distinguished by short reaction times. The novel compounds are used as binder resins for printing inks which are used for illustration gravure printing with toluene and can be formulated with a low solids content.

As is known, printing inks for illustration gravure printing with toluene can be prepared by pigmenting a varnish, it being possible for the varnish to be obtained by dissolving suitable binder resins in toluene with addition of various auxiliaries. Possible auxiliaries are, for example, flow regulators, waxes, and pigment wetting agents, and if appropriate further additives for improving the binder properties, for example the gloss and the abrasion resistance of the print film. The binder resin here has the task of anchoring the pigment to the printed material. The development of particularly high-speed printing machines and the trend toward also printing non-coated papers of increased absorbency to an increased extent, in addition to coated papers, impose particularly high requirements on the quality of these binder resins. In particular, they must impart a good status to the color film on the printed material. Under no circumstances should binder resins diffuse into the inside together with pigment, since this is accompanied by a loss of gloss and impaired abrasion resistance. It is known that binder resins of high molecular weight are of advantage, since they have reduced absorption properties in the printed material. Since the required printing viscosity furthermore can be established with a reduced solids content in comparison with low-viscosity binder resins, the economics of the print formulation are improved.

If binder resins based on natural resin acid are used, they must be modified in a suitable manner in order to build up the molecular weight. As is known, it is not sufficient to react the natural resin acids only with polyols, since the resulting molecular weights are still too low for advantageous use. However, an increase can be achieved if the products are additionally modified with phenol/aldehyde condensation products and with $\alpha, \beta$-ethylenically unsaturated carboxylic acids or anhydrides thereof, such as, for example, maleic anhydride or fumaric acid. In the reaction with the natural resin, the monofunctional acids contained therein, such as, for example, pimaric, abietic and neoabietic acid, are converted into an acid having three acid functions, so-called maleopimaric acid. This is now particularly suitable for crosslinking with polyols, which leads to high molecular weights. Nevertheless, a precondition for the molecular weight build-up is that the acid groups are reacted as far as possible. Acid numbers which are below 40 mg of KOH/g of resin are typically required. As is known, relatively long reaction times at high temperatures are then necessary for this polycondensation reaction, which is a disadvantage for industrial preparation because of the low time yield. Such resins of colophony, fumaric acid, diphenylolpropane, formaldehyde and pentaerythritol have been disclosed, for example, in the patent specification U.S. Pat. No. 4,857,624.

The present invention was thus based on the object of providing synthetic resins which can be prepared without co-using $\alpha, \beta$-ethylenically unsaturated carboxylic acid derivatives, nevertheless have a high molecular weight and therefore have high solution viscosities in toluene, and require only a short reaction time for their preparation.

It has now been found, surprisingly, that synthetic resins which have these properties and which are suitable as binder resins for the preparation of printing inks for illustration gravure printing with toluene can be obtained by a process in which, in the preparation of printing ink resins based on phenolic-resin-modified natural resin acid esters, calcium compounds and/or zinc compounds are used as a catalyst for the resol formation from phenols and aldehydes in the natural resin melt and for the natural resin acid esterification, and the water formed during the condensation reaction and the natural resin acid esterification is removed by azeotropic distillation, with the additional use of an inert organic solvent capable of azeotrope formation with water. The synthetic resins which result here display high solution viscosities in toluene and can be prepared in a considerably shorter reaction time than comparable resins modified with $\alpha, \beta$-ethylenically unsaturated carboxylic acid derivatives.

The invention therefore relates to phenolic-resin-modified natural resin acid esters which have high solution viscosities in toluene consisting of compounds selected from at least one compound of each of the compounds a) natural resins and natural resin acids, b) mononuclear and polynuclear alkylolizable phenols, c) aldehydes and aldehyde acetals, d) aliphatic, cycloaliphatic and araliphatic polyols, e) calcium compounds and zinc compounds, and appropriate, further compounds of the substance group comprising f) ethylenically unsaturated hydrocarbon resins, and which can be prepared in short reaction times, and are prepared by reaction at a temperature of 100° to 250° C., and subsequent removal of the water by azeotropic distillation with an entraining agent at 200° to 300° C.

In the preparation of the novel phenolic-resin-modified natural resin acid esters, it is particularly important that, in the first process stage, calcium compounds and/or zinc compounds are used as condensation catalysts and, in the second process stage, an inert organic solvent which is capable of azeotropic distillation of water at the reaction temperature is used as the entraining agent for azeotropic distillation of the water of reaction and the water of reaction is removed from the circulation and eliminated by continuous azeotropic distillation from the reaction mixture. Only the combination of the two measures, surprisingly, leads to the increase in molecular weight and viscosity of the binder resin and to the shortening of its reaction time, while the individual application of only one of either of the these measures does not achieve the object according to the invention. A synergistic effect which was neither known nor predictable and was therefore highly surprising and unexpected accordingly is evidently achieved with the combined use according to the invention of azeotropic distillation using calcium compounds and/or zinc compounds.

The content of the individual components, including the entraining agent, based on the total amount of all the components, is 30 to 95% by weight, preferably 40 to 90% by weight, in particular 50 to 80% by weight, of natural resins or natural resin acids from substance group A), 1 to 45% by weight, preferably 5 to 30% by weight, in particular 10 to 25% by weight, of phenolic components from substance group B) and 2 to 20% by weight, preferably 3 to 10% by weight, in particular 5 to 8% by weight, of aldehyde components from substance group C) or, if appropriate, instead of the components from substance groups B) and C), or as a proportion with these, up to 65% by weight of condensation products in a phenol-resol form prepared separately from compounds of substance groups B) and C), 1 to 20% by weight, preferably 3 to 15% by weight, in particular 4 to 10% by weight, of polyol components from substance group D), 0.01 to 5% by weight, preferably 0.1 to 2% by weight, in particular 0.3 to 1.5% by weight, calculated as CaO and/or ZnO, of calcium compounds and/or zinc compounds from substance group E), 0 to 30% by weight, preferably 1 to 25% by weight, in particular 2 to 10% by weight, of hydrocarbon resin components from substance group F) and 0.01 to 20% by weight, preferably 3 to 15% by weight, in particular 4 to 10% by weight, of inert entraining agent.

Possible compounds of substance groups A) to F) are, preferably:

A) Natural resins or natural resin acids, for example, colophony (tree resin), root resin, tall resin and natural resins which are partly hydrogenated, disproportionated or dimerized. The resins and resin acids have, where appropriate, a bromine number (=amount of bromine absorbed in g per 100 g of resin) in the range from preferably 200 to 280 and an acid number in the range from preferably 100 to 200 mg of KOH/g of resin;

B) Mononuclear or polynuclear phenols, preferably those which are polyfunctional toward oxo compounds, in particular phenol, $(C_1-C_{12})$-alkylphenols, aryl- or aralkylphenols, cresols, 1,3,5-xylenols, isopropyl-, p-tert-butyl-, amyl-, octyl- or nonylphenol, diphenylolpropane, phenylphenol, cumylphenol and addition products of phenols and ethylenically unsaturated monomers, preferably styrene, α-methylstyrene, α-chlorostyrene, vinyltoluene or cyclopentadiene. Tri- and tetrafunctional phenols, in which more than two positions on the benzene ring are reacted and capable of aldehyde addition, such as, for example, phenol or diphenylol- propane, are preferred. Mono- or bifunctional phenols, such as, for example, alkyl- or aralkylphenols, for example, nonylphenol or octylphenol, can also be used. The desired compatibilities of the resins according to the invention with the pigments used for illustration gravure printing with toluene can be achieved very advantageously with the particularly preferred tri- and tetrafunctional phenols. The known reaction products of trifunctional phenols with ethylenically unsaturated monomers furthermore have an advantageous effect in the same manner, so that these reaction products are also preferred phenol components. On the other hand, lower melt viscosities of the resin mixtures during preparation thereof can be established with the mono- or bifunctional phenols. However, their use by themselves is not preferred since they may impair wetting of the pigment. Instead, they are employed in mixtures together with tri- or tetrafunctional phenols, in which case their content can be up to 90% by weight, based on the total amount of phenols employed.

C) Aldehydes or aldehydes acetals, preferably aliphatic $(C_1-C_7)$-aldehydes, in particular formaldehyde in its various monomeric, oligomeric and polymeric forms, acetaldehyde, butyraldehyde and isobutyraldehyde, and furthermore benzaldehyde, furfural and glyoxal.

The molar ratio of phenol component from B) to aldehyde component from C) can be varied within wide limits for the phenolresol formation and is preferably in the range from 1:0.9 to 1:4.5, in particular 1:1 to 1:3.5. Excess or unreacted aldehyde is removed from the reaction mixture, preferably by distillation. The solution viscosity and the pigment wetting of the phenolic-resin-modified natural resin acid esters prepared according to the invention and obtainable as end products can be influenced or controlled in a convenient manner by the nature and amount of starting components used for the phenol-resol resin formation, it being possible for the content of phenolic resin components in the end product to be preferably up to 65% by weight, based on the end product.

The phenol-resol resin formation can also be carried out separately by known methods from phenol and aldehydes and basic catalysts at temperatures of between 50° and 160° C., preferably at 60° to 100° C., under normal pressure or increased pressure in an autoclave, and the product can then be added to the natural resin or natural resin acid melt according to the invention instead of corresponding amounts of phenol components from substance group B) and aldehyde components from substance group C). However, phenolresol resin formation form phenol components and aldehyde components in situ in the natural resin or natural resin acid melt is preferred.

D) All compounds which are known from polyester resin preparation and contain several hydroxyl groups can be used as esterifying agents, preferably polyfunctional alcohols. Glycerol, trimethylolpropane and pentaerythritol are particularly preferred.

E) Calcium compounds and/or zinc compounds are absolutely necessary as condensation catalysts. The oxides, hydroxides or salts of weak organic acids, in particular carbonates, bicarbonates, acetates, formates and oxalates, are preferred.

Magnesium compounds can also be co-used in minor amounts of up to not more than ⅓ equivalent, based on the number of equivalents of calcium compounds and/or zinc compounds employed. If magnesium compounds are used by themselves without calcium compounds and/or zinc compounds, the end products resulting in the resin preparation by azeoptropic distillation may undergo changes which no longer lead to products according to the invention. For example, they may lead to products which have too poor a solubility in toluene or which display only inadequate wetting of the pigments used in illustration gravure printing. These differences in the activity of the various metal compounds which are usually used in binder resin preparation for printing inks, and the influence thereof on the build-up of the polycondensates, are exceptionally surprising.

F) Suitable ethylenically unsaturated hydrocarbon resins are preferably those with macromolecules which contain isoprene, cyclopentadiene, dicyclopentadiene, cumarone, indene and styrene units, the hydrocarbon resins optionally being co-used in amounts of preferably up to 30% by weight, based on the end product. It is also possible to employ compounds of substance group F) or their monomers in the form of copolymers with the compounds from substance group A).

The products according to the invention are prepared in two stages. In the first stage, a mixture of components A) to E), optionally together with component F) is reacted at a temperature of 100° to 250° C., preferably 110° to 160° C., preferably under a pressure of 1 to 10 bar, in particular 1 to 5 bar.

In the second reaction stage, the water of reaction formed is distilled azeotropically with an inert entraining agent. Possible inert entraining agents, which are preferably added in stage 3 of the synthesis process according to the invention in the preparation of resins according to the invention and can form azeotropes with water under the reaction conditions, are preferably saturated aliphatic or aromatic hydrocarbons, the boiling points of which under normal pressure are preferably above 100° C., for example alkanes, in particular hexane and decane, mixtures of aliphatic hydrocarbons, such as exist, for example, in gasoline or in corresponding mineral oil fractions, and furthermore preferably toluene or xylene.

The entraining agent is preferably added via an inlet tube at the base of the reaction vessel. Small amounts of entraining agent can also already be added in the first stage of the synthesis process in order to lower the melt viscosity of the starting components. Preferably, the entire amount of entraining agent is added at the latest when a reaction temperature of 200° C. is reached.

The azeotropic distillation is carried out at temperatures of 200° to 300° C., preferably 220° to 270° C, in particular 240 to 260° C., under a pressure of 1 to 10 bar. The procedure under normal pressure is particularly preferred.

It is particularly important that water of reaction formed in the condensation reaction is removed continuously and completely from the reaction mixture by azeotropic distillation by means of these entraining agents, the entraining agent preferably being passed in circulation, and that when the removal of water has ended, the entraining agent is distilled off from the reaction mixture again. If this condition of continuous and exclusively azeotropic removal of the water of reaction from the circulation is not met consistently, the desired properties of the end product and the advantage of shortening of the reaction time may be partly or completely lost.

The progress of the condensation reaction during the synthesis process is monitored with the aid of the acid number of the reaction mixture. The acid number of the resin mixture thus initially can preferably be up to 200 mg of KOH/g of resin, determined by the customary methods. As the reaction progresses, it decreases continuously, with elimination of water and azeotropic removal of water from the circulation, and the esterification reaction is continued until the reaction according to the invention has reached the desired end stage and the acid number has fallen to values of <50, preferably <40 mg of KOH/g of resin. Thereafter, the entraining agent is removed from the reaction product by distillation, finally in vacuo. This is in general initially effected under normal pressure, and finally in vacuo under pressures of between 1000 and 0.1 mbar, preferably 200 to 50 mbar, and at temperatures of up to 300° C., preferably up to 280° C.

The resins according to the invention can also be further processed during or, preferably, after the actual reactions according to the invention by adding additional compounds.

It is possible, for example, to add low molecular weight compounds, for example, colophony, colophony ester or vegetable oils, or polymers, for example, phenolic resins, polyesters, alkyd resins, acrylic polymers, polystyrene, modified silica gels, modified cellulose derivatives and mixtures thereof, to optimize the solution viscosities required.

The preparation of the binder resins according to the invention by azeotropic distillation in combination with calcium compounds and/or zinc compounds as condensation catalysts can cause a ten-fold increase in the molecular weight, an increase in the viscosity by a factor of 20 and a halving of the reaction time, compared with the process of the prior art. If binder resins which have comparable use properties, for example, acid number, molecular weight and viscosity, to the binder resins of the process according to the invention are prepared by known processes by modification with $\alpha$, $\beta$-ethylenically unsaturated carboxylic acid derivatives, the latter resins require a significantly shorter reaction time for their preparation. This can be up to 50% below that of products modified with the acid derivatives. Furthermore, with the aid of the process according to the invention, it is even possible to prepare binder resins of even higher viscosity than those compounds show in a shorter reaction time than corresponds to the prior art to date. These results were not foreseeable and are therefore exceptionally surprising. The preparation of the novel products according to the invention on an industrial scale thus proves to be exceptionally favorable, since very advantageous properties and time yields result in comparison with the prior art.

The molecular weight of the resins according to the invention can be determined by known methods by gel permeation chromatography of the resin solutions in tetrahydrofuran (THF) on polystyrene gel in a permeation measuring instrument. From the measurement results obtained, the molecular weight (weight-average $M_W$) of the resins according to the invention preferably has values of $M_W > 5000$ and has no critical upper limit. However, the molecular weights $M_W$ are particularly preferably in an average range of between 5000 and 100,000, in particular 15,000 to 60,000.

For determination of the viscosities, for example, the 25% strength by weight toluene solutions are measured with a customary rotary viscometer at 23° C. The viscosities are preferably in a range from 3 to 100 mPa.s.

The invention furthermore relates to the use of the resins according to the invention as binder resins in printing inks for illustration gravure printing with toluene. The synthetic resins according to the invention have high viscosities in toluene solution and display excellent compatibilities with other binders, for example, natural resin acid esters of the prior art, resinates or hydrocarbon resins. They furthermore have excellent wetting properties for the pigments used in the illustration gravure printing. They therefore allow the formulation of inks of low solids content, preferably in combination with other binder reins. If gloss development requirements are not too high it is even possible, however, to employ the resins according to the invention as the sole binder resin, inks having very low solids contents being formed. This means both economic and ecological progress, since the inks are more economic to formulate and, for example, less resin waste is formed during recycling of paper printed with the inks.

The toluene gravure printing inks are formulated by the customary methods, suitable binder resins, for example, phenolic-resin-modified natural resin acid esters, hydrocarbon resins or resinates, being dissolved in toluene and this varnish being pigmented. Additives which can be co-used are those which are otherwise customary, for example, fillers, such as calcium carbonate, or surface-active agents to improve dispersion of the pigment, such as lecithin, or waxes to improve the abrasion resistance.

The invention is illustrated in more detail by the following examples, but these do not limit the invention.

COMPARISON EXAMPLE 1

Preparation of a binder without maleic anhydride by known processes, i.e. without azeotropic distillation of the water of reaction, a low-viscosity resin being obtained.

527 g of commercially available colophony, which is also called natural resin or natural resin acid, 58 g of nonylphenol, 63 g of diphenylolpropane and 48 g of glycerol are melted in a heatable 2 liter multi-necked flask with a stirrer, thermometer, dropping funnel, reflux condenser and filling tuber under a nitrogen atmosphere. 8.8 g of calcium hydroxide, which corresponds to a content of 0.9% by weight (calculated as CaO) based on the total weight, suspended in 30 ml of xylene, are then added dropwise to the hot melt at 100° C., and 45 g of paraformaldehyde are then introduced. The mixture is then homogenized for 30 minutes, while stirring. The heating is then adjusted to a temperature of 130° C., water starting to condense in the reflux condenser. After 2 hours, the condenser is replaced by a descending condenser and water, xylene and resin oil are distilled off. During this operation, the temperature is increased to 250° C. and the progress of the reaction is determined with the aid of the acid number of the product. As soon as this has fallen to 25 mg of KOH/g, volatile fractions are distilled off in vacuo under 100 mbar for 10 minutes. After pressure compensation with nitrogen, the melt is drained, 637 g of a brittle, pulverizable resin being obtained after cooling. The resin has a softening point of 135° C. A 50% strength solution in toluene has, at 23° C., a viscosity of 2062 and a 25% strength solution a viscosity of 5 mPa.s. The average molecular weight determined by gel permeation chromatography is found to be 13,500. The reaction time for the preparation time is 13 hours.

EXAMPLE 1

Preparation of a binder resin according to the invention by azeotropic distillation using the recipe of Comparison Example 1, a product which is highly viscous in toluene being obtained in a shorter reaction time.

527 g of commercially available colophony, which is also called natural resin or natural resin acid, 58 g of nonylphenol, 63 g of diphenylolpropane and 48 g of glycerol are melted in a heatable 2 liter multi-necked flask with a stirrer, thermometer, dropping funnel, reflux condenser and filling tube. 8.8 g of calcium hydroxide, which corresponds to a content of 0.9% by weight (calculated as CaO), based on the total weight, suspended in 30 ml of xylene, are then added dropwise to the hot melt at 100° C. and 45 g of paraformaldehyde are then introduced. The mixture is then homogenized for 30 minutes, while stirring. The heating is then adjusted to a temperature of 130° C, water starting to condense in the reflux condenser. After 2 hours, the condenser is combined with an azeotropic water separator and water is distilled off with xylene in circulation. During this operation, the temperature is increased continuously to 250° C., a further 50 g of xylene being added when 200° C. is reached. Water is in this process distilled off constantly as an azeotrope with xylene. The progress of the reaction is determined with the aid of the acid number of the product. As soon as this has fallen to 25 mg of KOH/g of resin, the elimination of water has largely ended. The solvent in the melt is distilled off, initially under normal pressure, for 30 minutes. Volatile constituents are distilled off in vacuo under 100 mbar for 10 minutes. After pressure compensation with nitrogen, the melt is drained, 644 g of a brittle, pulverizable resin being obtained after cooling. The resin has a softening point of 150° C. A 50% strength solution in toluene has, at 23° C., a viscosity of 182,000, and a 25% strength solution a viscosity of 30 mPa.s. The average molecular weight, determined by gel permeation chromatography, is 41,500. The reaction time for the preparation is 8 hours.

EXAMPLE 2

Preparation of a binder resin according to the invention using the recipe of Example 1, calcium hydroxide being replaced by the equivalent amount of zinc oxide.

Instead of 8.8 g of calcium hydroxide, 9.6 g of zinc oxide, which corresponds to a content of 1.3% by weight, based on the total weight, are used. After a reaction time of 8 hours, 651 g of a brittle resin which starts to soften above 145° C. are obtained. A 50% strength solution in toluene has a viscosity of 1,310 mPa.s and a 25% strength solution in toluene has a viscosity of 12 mPa.s. The molecular weight, determined by gel permeation chromatography, is 41,020.

EXAMPLE 3

Preparation of a binder resin according to the invention by the process of Example 1, a mixture of calcium hydroxide and zinc oxide being used.

The procedure is as described in Example 1, with the modification that instead of 8.8 g of calcium hydroxide, a mixture of 5 g of zinc oxide and 5 g of calcium hydroxide is employed, which corresponds to a content of 1.2% by weight, based on the total recipe (calculated as oxide). The resin obtained after a reaction time of 8 hours has a viscosity of 1,200 mPa.s as a 50% strength solution in toluene and a viscosity of 9 mPa.s as a 25% strength solution in toluene. The average molecular weight, determined by gel permeation chromatography, is 27,500.

COMPARISON EXAMPLE 2

Preparation of a binder resin with fumaric acid by known processes in accordance with the patent specification US 4,857,624, a product having a high viscosity in toluene being obtained with a longer reaction time.

723 g of commercially available colophony are melted in a heatable 2 liter multi-necked flask with a stirrer, thermometer, dropping funnel, reflux condenser and filling tube under a nitrogen atmosphere, and 56.2 g of fumaric acid are added at 160° C. When the exothermic reaction has subsided, the mixture is allowed to after-react for a further hour. It is then cooled to 100° C., and 72.7 g of diphenylolpropane (bisphenol A), 117 g of pentaerythritol, 0.6 g of magnesium oxide and 29.4 g of paraformaldehyde are added to the mixture. The mixture is then homogenized for 30 minutes, while stirring. The heating is then adjusted to a temperature of 130° C., water starting to condense in the reflux condenser. After 2 hours, the condenser is replaced by a descending condenser and water and resin oil are distilled off. During this operation, the temperature is increased to 260° C. and the progress of the reaction is determined with the aid of the acid number and viscosity development of the product. As soon as the acid number has fallen to 25 mg of KOH/g of resin and the viscosity of a 50% solution in toluene at 23° C. has reached 1600 mPa.s, volatile fractions are distilled off in vacuo under 100mbar for 10 minutes. After pressure compensation with nitrogen, the melt is drained, 890 g of a brittle, pulverizable resin, which has a softening point of 145° C. and a viscosity of 8 mPa.s as a 25% strength solution in toluene, being obtained after cooling. The reaction time for its preparation is 14 hours.

COMPARISON EXAMPLE 3

Preparation of a binder resin using the recipe and process of Example 1, calcium hydroxide being replaced by the equivalent amount of magnesium oxide.

The procedure is as described in Example 1, with the modification that the 8.8 g of calcium hydroxide are replaced by 4.8 g of magnesium hydroxide. After a reaction time of 6 hours, the batch crystallizes out, a product which is unusable for the use according to the invention being obtained, since it dissolved only inadequately in toluene.

COMPARISON EXAMPLE 4

Preparation of a toluene-soluble binder resin with magnesium oxide. A product with poor pigment wetting is obtained.

527 g of colophony, 200 g of nonylphenol, 12 g of diphenylolpropane, 48 g of glycerol, 6 g of magnesium oxide and 68 g of formaldehyde are subjected to condensation with one another analogously to Example 1. After a reaction time of 8 hours, a product of melting point 139° C., which has a viscosity of 18 mPa.s as a 25% strength solution in toluene, is obtained. The average molecular weight, determined by gel permeation chromatography, is 17,760.

EXAMPLE 4

Preparation of a binder resin according to the invention by azeotropic distillation using the receipe of Example 1, but carrying out the resol formation under pressure.

527 g of commercially available colophony, which is also called natural resin or natural resin acid, 58 g of nonylphenol, 63 g of diphenylolpropane and 48 g of glycerol are melted in a heatable 2 liter apparatus with a stirrer, thermometer, dropping funnel, reflux condenser and filling tube under a nitrogen atmosphere. 8.8 g of calcium hydroxide, which corresponds to a content of 1.2% by weight, based on the total weight, suspended in 30 ml of xylene, are then added dropwise to the hot melt at 100° C., and 45 g of paraformaldehyde are then introduced. The mixture is then homogenized for 30 minutes, while stirring. The apparatus is then sealed pressure-tightly and the heating is adjusted to a temperature of 130° C., a pressure of up to 2 bar building up. After 2 hours, the condenser is combined with an azeotropic water separator and water is distilled off with xylene in circulation. During this operation, the temperature is increased continuously to 250° C., a further 50 g of xylene being added when 200° C. is reached. The water is in this process distilled off constantly as an azeotrope with xylene. The progress of the reaction is determined with the aid of the acid number of the product. As soon as this has fallen to 25 mg of KOH/g of resin, the splitting off of water has largely ended. The solvent in the melt is distilled off, initially under normal pressure, for 30 minutes. Volatile fractions are distilled off in vacuo under 100 mbar in the course of 10 minutes. After pressure compensation with nitrogen, the melt is drained, 648 g of a brittle, pulverizable resin being obtained after cooling. The resin has a softening point of 152° C. A 50% strength solution in toluene has, at 23° C., a viscosity of 241,000 and a 25% strength solution a viscosity of 580 mPa.s. The average molecular weight, determined by gel permeation chromatography, is 47,800. The reaction time for the preparation is 8 hours.

EXAMPLE 5

Preparation of binder resin according to the invention, which is modified with a hydrocarbon resin, in addition to the natural resin.

The procedure is as in Example 2, with the modification that instead of 527 g of colophony, a mixture of 475 g of colophony and 52 g of a natural resin acid-modified cyclopentadiene resin (acid number 12 mg of KOH/g of resin, iodine number 197 g of iodine/100 g of resin) are employed. The resulting product has a softening point of 120° C. and an acid number of 14 mg of KOH/g of resin. The viscosity of a 25% strength solution in toluene is 14 mPa.s. The average molecular weight, determined by gel permeation chromatography, is 19,200 and the reaction time is 8 hours.

EXAMPLE 6

Preparation of a binder resin according to the invention using tall resin as the natural resin component and pentaerythritol as the esterifying agent.

600 g of American tall resin, 33 g of nonylphenol, 87 g of diphenylolpropane, 61 g of pentaerythritol, 51 g of paraformaldehyde, 5 g of calcium hydroxide and 5 g of zinc oxide are reacted analogously to Example 1 but at an esterification temperature of 260° instead of 250° C. After a reaction time of 9 hours, a resin of melting point 135° C. and having an acid number of 36 mg of KOH/g of resin is obtained. A 25% strength solution of the resin in toluene has a viscosity of 11 mPa.s.

EXAMPLE 7

Preparation of a binder resin according to the invention which contains t-butylphenol in the resol component.

600 g of colophony, 39 g of t-butylphenol, 75 g of diphenylolpropane, 55 g of glycerol, 10 g of zinc oxide (corresponds to a content of 1.2% by weight) and 51 g of paraformaldehyde are subjected to a condensation reaction in accordance with Example 1. After a reaction time of 8 hours, 705 g of solid resin of melting point 138° C are obtained. A 25% strength solution in toluene has a viscosity of 5 mPa.s.

Use technology comparison

Inks for illustration gravure printing with toluene were prepared by customary processes in each case from the binder resins of Examples 1 (ink A) and 2 (ink B) and Comparison Examples 1 (ink C), 2 (ink D) and 4 (ink E) by dispersing a mixture of 15 g of binder resin, 9 g of lithol ruby pigment, 76 g of toluene and paper was printed with the inks by the gravure printing process.

The gloss of the prints, which should be as high as possible for a good printing result, was then measured with a Lange laboratory reflectometer at an angle of incidence of 60° C.

The penetration of the inkst to the reverse of the printed material, which should be as weak as possible for good printing properties, was evaluated optically by measurement of the relative color density of the reverse side of the printed material compared with the front side.

| Color | A | B | C | D | E |
|---|---|---|---|---|---|
| Gloss [%] | 55 | 53 | 43 | 49 | 41 |
| Penetration (color density)* | weak (1) | weak (1) | intense (5) | moderate (3) | intense (5) |

*0 no color density on the reverse side
6 maximal color density on the reverse side (identical to color density of the front side

What is claimed:

1. A phenolic-resin-modified natural resin acid ester prepared from compounds selected from the group consisting of A) natural resins and natural resin acids,
B) mononuclear and polynuclear alkylolizable phenols,
C) aldehydes and aldehyde acetals,
D) aliphatic, cycloaliphatic and araliphatic polyols,
E) calcium compounds and zinc compounds and
F) ethylenically unsaturated hydrocarbon resins;

by reaction of at least one compound of each of A) to E) and optionally F); at a temperature of 100° to 250° C.; and by subsequent removal of water by azeotropic distillation with an entraining agent at 200° to 300° C.

2. A process for preparing the phenolic-resin-modified natural resin acid ester as claimed in claim 1, comprising reacting 30 to 95% by weight of natural resins or natural resin acids from substance group A), 1 to 45% by weight, of phenolic components from substance group B) and 2 to 20% by weight of aldehyde components from substance group C), or optionally, instead of the components from substance groups B) and C) or as a proportion with these, up to 65% by weight of condensation products in a phenol-resol form prepared separately from compounds of substance groups B) and C), 1 to 20% by weight of polyol components from substance group D), 0.01% to 5% by weight, calculated as CaO and/or ZnO, of calcium compounds and/or zinc compounds from substance group E), 0 to 30% by weight of hydrocarbon resin components from substance group F) together with 0.01 to 20% by weight of an inert entraining agent, each time relative to the total amount of components employed.

3. Binder resins for printing inks comprising a phenolic-resin-modified natural resin acid ester as claimed in claim 1 and additives chosen from colophony, colophony ester, vegetable oils and polymers.

4. A binder resin of claim 3 wherein the additives are selected from the group consisting of phenolic resins, polyesters, alkyd resins, acrylic polymers, polystyrene, modified silica gels and modified cellulose derivatives and mixtures thereof.

5. A printing ink for illustration gravure printing containing a phenolic-resin-modified natural resin acid ester of claim 1 as binder resins.

\* \* \* \* \*